United States Patent
Guzik

(10) Patent No.: US 10,794,712 B2
(45) Date of Patent: Oct. 6, 2020

(54) DYNAMIC TARGET COVERAGE USING MOBILE ASSETS

(71) Applicants: WHP WORKFLOW SOLUTIONS, INC., North Charleston, SC (US); GETAC TECHNOLOGY CORPORATION, Taipei (TW)

(72) Inventor: Thomas Guzik, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 186 days.

(21) Appl. No.: 15/712,077

(22) Filed: Sep. 21, 2017

(65) Prior Publication Data

US 2019/0086220 A1 Mar. 21, 2019

(51) Int. Cl.
| G01C 21/34 | (2006.01) |
| G01C 21/20 | (2006.01) |
| G01C 21/00 | (2006.01) |
| G06Q 10/04 | (2012.01) |

(52) U.S. Cl.
CPC ....... G01C 21/3415 (2013.01); G01C 21/005 (2013.01); G01C 21/20 (2013.01); G06Q 10/047 (2013.01)

(58) Field of Classification Search
CPC .. G01C 21/005; G01C 21/20; G01C 21/3415; G06Q 10/047
See application file for complete search history.

(56) References Cited

U.S. PATENT DOCUMENTS

| 10,325,505 | B2* | 6/2019 | Gao | G08G 5/0069 |
| 2004/0030571 | A1* | 2/2004 | Solomon | F41H 13/00 700/248 |
| 2005/0216182 | A1* | 9/2005 | Hussain | G01C 21/20 701/532 |
| 2009/0219393 | A1* | 9/2009 | Vian | G07C 5/008 348/144 |
| 2009/0254405 | A1* | 10/2009 | Hollis | G06Q 10/06 705/7.25 |
| 2010/0042269 | A1* | 2/2010 | Kokkeby | G01S 3/7864 701/3 |
| 2015/0323932 | A1* | 11/2015 | Paduano | G05D 1/042 701/3 |
| 2016/0035224 | A1* | 2/2016 | Yang | G08G 5/0078 701/23 |
| 2016/0328979 | A1* | 11/2016 | Postrel | B64C 39/024 |
| 2016/0357183 | A1* | 12/2016 | Shaw | G05D 1/0027 |
| 2017/0092109 | A1* | 3/2017 | Trundle | G16H 40/20 |

OTHER PUBLICATIONS

Baxter, et al., "Scheduling UAV Surveillance Tasks, Lessons Learnt from Trials with Users," IEEE International Conference on Systems, Man, and Cybernetics, 2013. (Year: 2013).*

* cited by examiner

*Primary Examiner* — Donald J Wallace
(74) *Attorney, Agent, or Firm* — Han Santos, PLLC

(57) ABSTRACT

Techniques for providing target coverage using mobile assets are described, including techniques for dynamically adjusting routing of mobile assets to cover targets when a disruption occurs in the original routing and target coverage plans. Mobile assets are assigned routes to cover target areas and adherence to the routes is monitored. If a first mobile asset experiences a route interruption, other mobile assets are automatically re-routed to cover the target areas originally covered by the route of the first mobile asset.

17 Claims, 8 Drawing Sheets

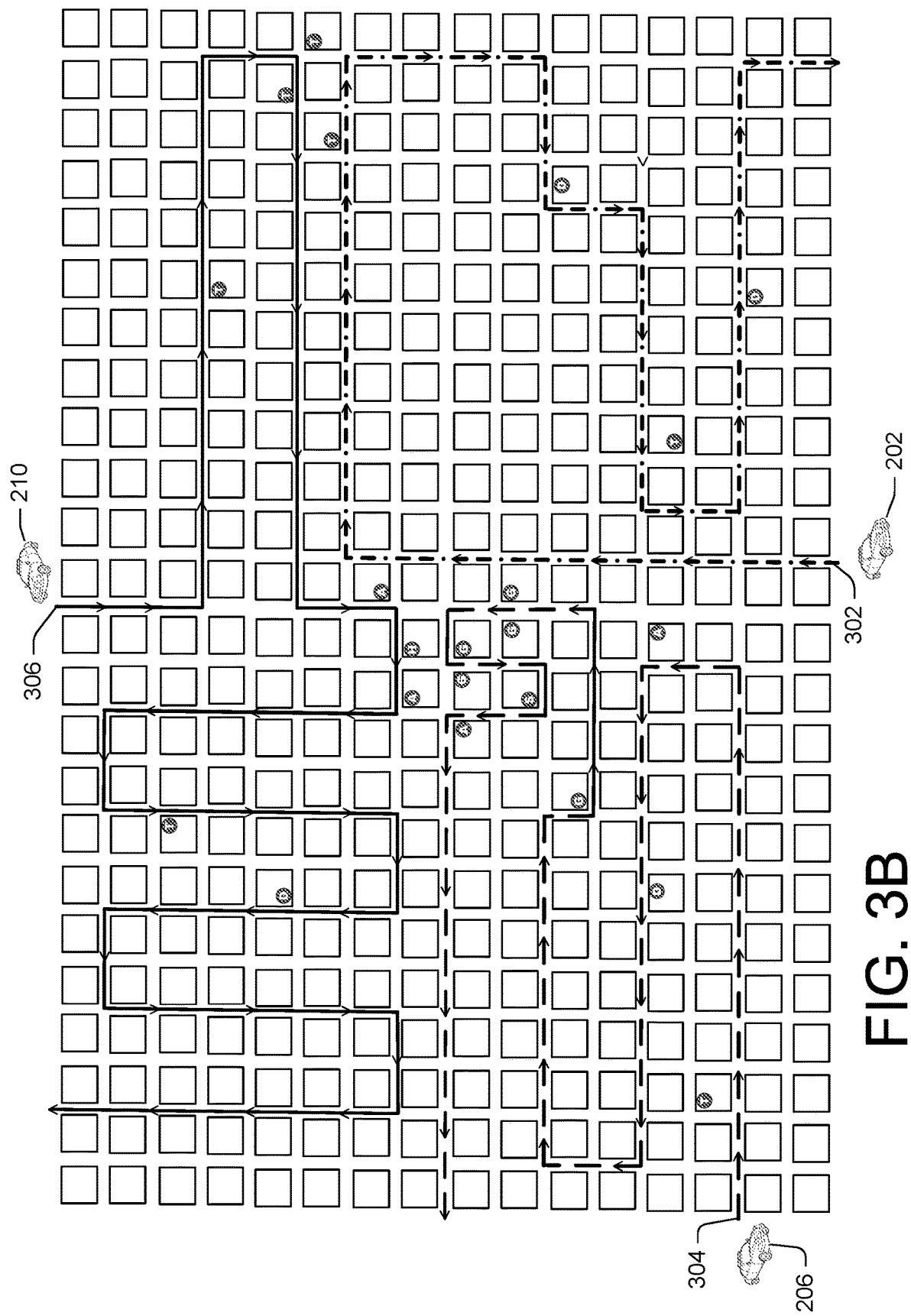

DYNAMIC TARGET COVERAGE USING MOBILE ASSETS

BACKGROUND

Many agencies and services rely on routing of mobile assets to perform the basic functions of the mission on which their business or activity is based. For example, law enforcement agencies route patrol cars, vehicles, and/or aircraft to cover certain territories to respond to and prevent crime. Taxi services route cabs to locations to service customers. Mail and parcel delivery services route motor vehicles to cover particular routes to deliver packages to specific addresses. Services that schedule on-site pickups—such as garbage collection services, donation collection services, or the like—provide routes to vehicles to cover addresses which have items to be picked up.

In any such system, unexpected changes can occur that disrupt the original plans that were made in the initial routings. A police car and officer can be called to the site of a crime, or to back up another officer. A taxi can be hailed by a passenger and taken out of its originally assigned zone. A parcel delivery or pick-up route can be disrupted by a vehicle breakdown, traffic conditions, inclement weather, etc.

Basically, any process that is designed to have mobile assets in particular places at particular times can be disrupted so that the objectives of the process are unable to be met.

SUMMARY

Described herein are techniques for dynamically adjusting routing of mobile assets to cover targets when a disruption occurs in the original routing or when coverage objectives and targets change. Revised routes are assigned to mobile assets such that certain updated coverage objectives are addressed based on real-time activities.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 3B is a diagram depicting the street grid as shown in FIG. 3A, showing updated routes for remaining law enforcement patrol vehicles.

DETAILED DESCRIPTION

Figure 1:
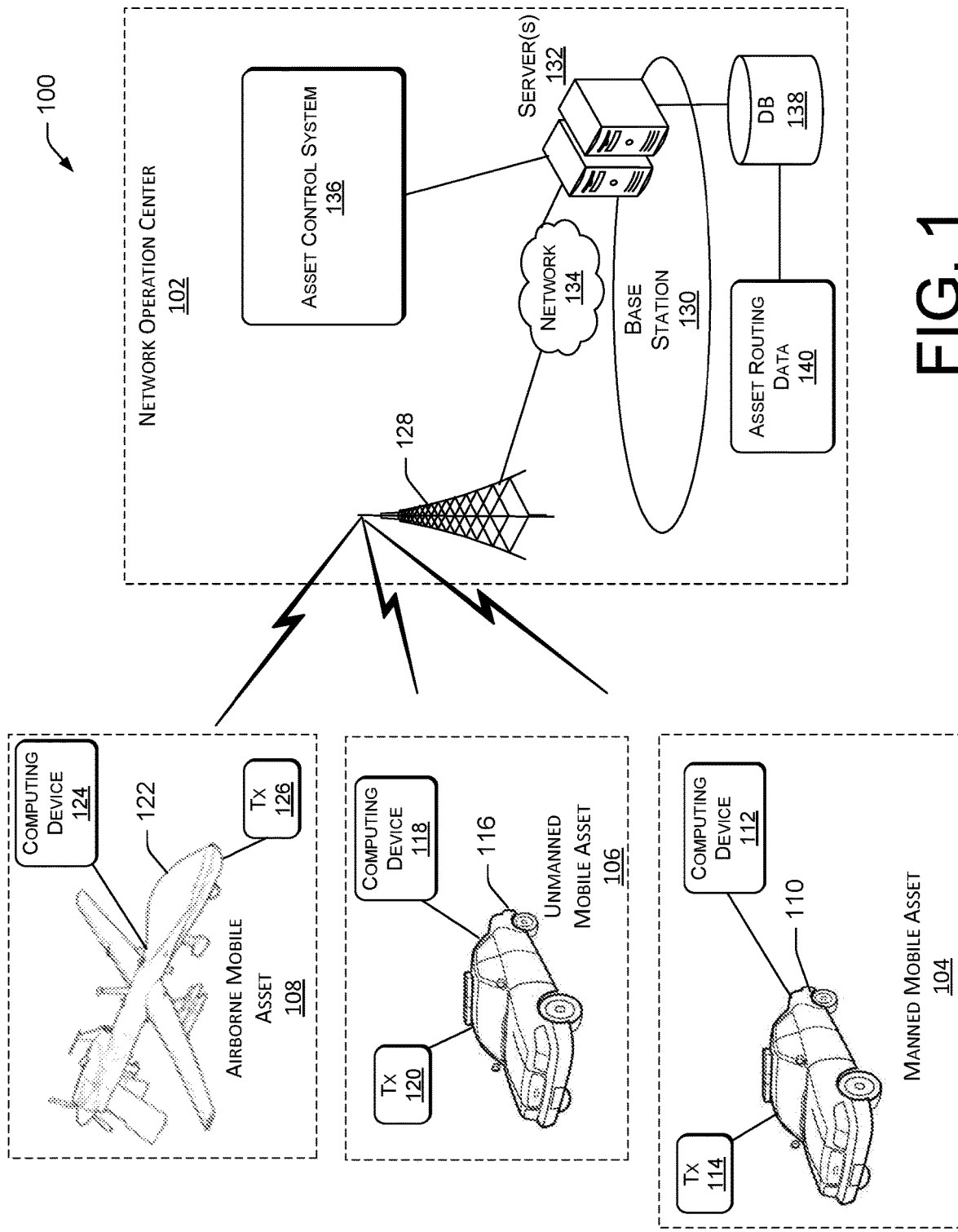
FIG. 1 illustrates an example architecture for systems and processes for dynamic target coverage using mobile assets as described herein.

This disclosure is directed to techniques for dynamically adjusting routing of mobile assets to cover targets when an interruption occurs in the original routing or when coverage objectives and targets change. Routes of mobile assets are monitored as are messages related to one or more of the mobile assets. When a route interruption is detected for a mobile asset, the routes of other mobile assets are re-calculated so that the coverage objectives are maintained.

As used herein, the term "mobile asset" refers to any asset or resource that is not confined to a stationary location. A mobile asset is typically a vehicle or non-stationary unit, such as an automobile, motorcycle, bicycle, an unmanned vehicle (UMV) such as a self-driven automobile, or an aircraft such as an airplane, a helicopter, a remotely piloted drone, etc. The asset or resource can also be a human being. The asset or resource can be the vehicle or non-stationary unit itself, or it can be a device mounted to a vehicle or mobile base.

A "target" is a location to be covered by a mobile asset. A location can be a specific address, an area (e.g., neighborhood, sector, etc.), a street, etc. One or several locations may be identified as targets for coverage objectives.

A "coverage objective" is a criterion or set of criteria that is to be met by routing a mobile asset relative to one or more targets. A coverage objective may be for a mobile asset to go to (i.e., stop at or pass by) a certain address or location within a specified period of time. For example, a coverage objective might be for a taxi driver to go to a residential address within thirty minutes. Another example of a coverage objective is for law enforcement vehicles to pass by a set of specific addresses a specified number of times within a specified period of time. An address can be a street address, a set of geographic coordinates, a designated area sector, a neighborhood, etc. In the case of aircraft, one example of a coverage objective is to obtain images of a particular location at a specified time or within a specified time period. Another example is for an aircraft to deliver an item (e.g., a package, a weapon, etc.) to a particular target.

A "route" is typically a travel path provided to a mobile asset that is to be traversed by the mobile asset. In some instances, a route can be a set of directions to reach a specified location, or a route might simply be a specified location. A route may designate travel along particular paths, such as streets or roads, or it may designate a flight path for an aircraft, or it can designate an area to be patrolled over a period of time.

An "interruption" occurs when a mobile asset that has been assigned a route is unable to complete the route or is otherwise unable to reach a target or a coverage objective. An interruption can occur when a mobile asset become inoperable and cannot reach a target destination. An interruption can also occur when an intervening event occurs that requires immediate re-assignment of a mobile asset on a route such that the mobile asset is not able to complete the route. An interruption can be detected by monitoring a mobile asset with respect to a route and detecting when the mobile asset deviates significantly from the route. An interruption can also be detected when a message includes content that indicates that the mobile asset will not be able to complete a route assigned to the mobile asset. For example, if a law enforcement vehicle is navigating along an assigned route when the law enforcement vehicle receives a message that indicates a priority for re-routing the law enforcement vehicle (e.g., "shots fired," "officer down," etc.), then the route of the law enforcement vehicle is interrupted.

It is noted that, although the following description describes details particularly relating to law enforcement assets and objectives, the techniques described herein can be applied to a number of different scenarios. For example, the techniques may be applied in the context of a delivery service, a taxi service, a garbage collection service, a debris removal service, a snow removal service, a bus service, an ambulance service, etc. Basically, the techniques described below can be applied to any route delivery business, where application of the techniques reduces operating expenses, thereby positively impacting the business.

The detailed description below, with reference to designated figures and elements, further describes details of particular implementations of techniques for dynamically adjusting routing of mobile assets to cover targets when an interruption occurs in the original routing or when coverage objectives and targets change.

Example Architecture

FIG. 1 illustrates an example base architecture 100 on which systems and processes for dynamic target coverage using mobile assets may be implemented. The example architecture 100 includes a Network Operations Center 102 (NOC), a manned mobile asset 104, an unmanned mobile asset 106, and an airborne mobile asset 108. Other mobile assets, although not shown in FIG. 1, may also be included. In operation, it is assumed that a significantly greater number of mobile assets will be implemented. Furthermore, other types of mobile assets not identified in FIG. 1 may also be used without departing from the presently identified concepts. Such other types of mobile assets include, but are not limited to, cars, motorcycles, bicycles, scooters, drones, airplanes, helicopters, and the like.

The manned mobile asset 104 includes an automobile 110, a computing device 112 and a transceiver 114. The computing device 112 is a personal computer or a specialized computer designed to operate within specialized parameters, and it is configured to perform at least a navigation function (routing, position indicator, etc.) that can comprise a global positioning system (GPS). Other functions may be performed by the computing device 112, such as audio recording and playback, video recording and playback, unit identification, communications, etc. Any function that is necessary to the operation of the manned mobile asset 104 to comply with the requirements set forth herein can be performed by the computing device 112. The transceiver 114 is a unit comprised of hardware, software, and/or firmware that is configured to transmit and receive messages and/or voice communications to the manned mobile asset 104 via radio, network, cellular telephone, or other communication means.

The unmanned mobile asset 106 includes an unmanned vehicle (UMV) 116, a computing device 118 and a transceiver 120. The unmanned mobile asset 106 is similar to the manned mobile asset 104 except that it does not require a human operator to be co-located with the vehicle. The computing device 118 is a personal computer or a specialized computer designed to operate within specialized parameters, and it is configured to perform at least a navigation function (routing, position indicator, etc.) that can comprise a global positioning system (GPS). Other functions may be performed by the computing device 112, such as audio recording and playback, video recording and playback, unit identification, communications, etc. Any function that is necessary to the operation of the unmanned mobile asset 106 to comply with the requirements set forth herein can be performed by the computing device 118. The transceiver 120 is a unit comprised of hardware, software, and/or firmware that is configured to transmit and receive messages and/or voice communications to the unmanned mobile asset 106 via radio, network, cellular telephone, or other communication means.

The airborne mobile vehicle 108 includes a drone 122, a computing device 124 and a transceiver 126. The drone 122 is a remotely piloted vehicle that may be equipped with an imaging system (not shown), a package securing device (not shown), or other type of device suitable for the objectives described herein. The computing device 124 is a personal computer or a specialized computer designed to operate within specialized parameters, and it is configured to perform at least a navigation function (routing, position indicator, etc.) that can comprise a global positioning system (GPS). Other functions may be performed by the computing device 124, such as audio recording and playback, video recording and playback, unit identification, communications, etc. Any function that is necessary to the operation of the airborne mobile asset 108 to comply with the requirements set forth herein can be performed by the computing device 124. The transceiver 126 is a unit comprised of hardware, software, and/or firmware that is configured to transmit and receive messages and/or voice communications to the airborne mobile asset 108 via radio, network, cellular telephone, or other communication means.

The Network Operations Center (NOC) 102 is generally a communication, command, and control system of the architecture 100. The NOC 102 is used as a base from which to monitor operations, gather and disseminate intelligence information, and monitor and control mobile assets 104, 106, 108. In one implementation of the presently described techniques, the NOC 102 is part of a law enforcement agency or a facility that is operated by a third-party that provides services to the law enforcement agency.

The Network Operations Center 102 includes communications means that enable human or computer communications with mobile assets and/or mobile asset operators in remote locations. Particularly, in this example, the NOC 102 includes a transmission tower 128 and a base station 130 that enable communications. One or more servers 132 provide a network 134 through which the NOC 102 communicates with mobile assets 104, 106, 108 and devices. The network 134 may be a local area network (LAN), a wide-area network (WAN), a carrier or cellular network, an over-the-air radio network, or a collection of networks that includes the Internet. Network communication protocols (TCP/IP, 3G, 4G, etc.) may be used to implement portions of the network 134.

The servers 132 in the Network Operations Center 102 include an asset control system 136 that contains programmatic logic used in the techniques described herein. The asset control system 136 is logically connected with a database 138, which stores information accessed and provided by the asset control system 136. Among other things, the database 138 stores asset routing data 140 that includes route data assigned to mobile assets 104, 106, 108. As will be described in greater detail below, the asset control system 136 computes routes for mobile assets 104, 106, 108 and monitors adherence to those routes. The routing data 140 includes at least information describing those routes.

Example Assets and Routes

Figure 2A:
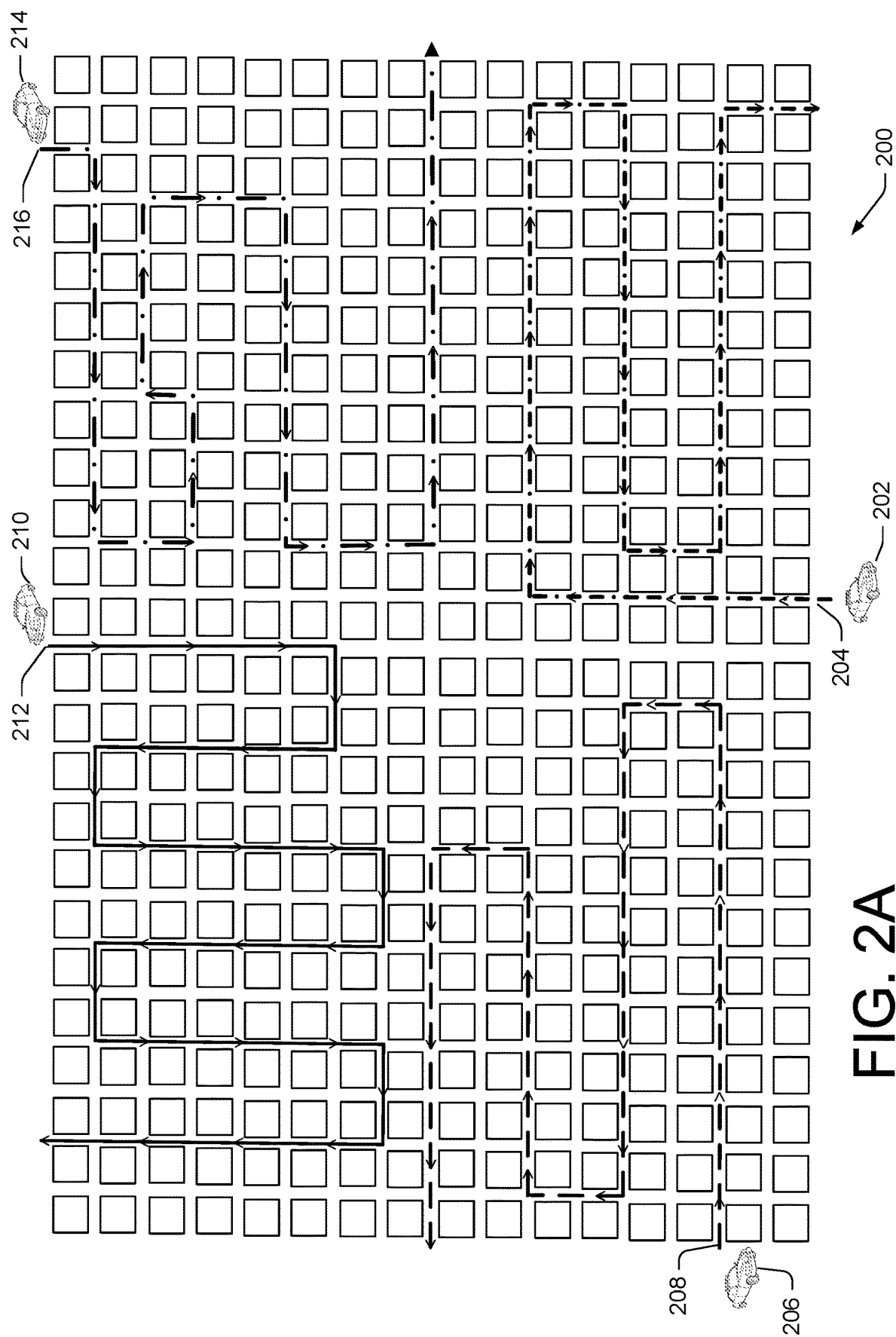
FIG. 2A is a diagram depicting a street grid and routes assigned to several law enforcement patrol vehicles.

FIG. 2A is a diagram depicting an example of mobile routes assets and includes a street grid 200 and routes associated with several mobile assets. FIG. 2A includes a first mobile asset 202 associated with a first route 204, a second mobile asset 206 associated with a second route 208, a third mobile asset 210 associated with a third route 212, and a fourth mobile asset 214 associated with a fourth route 216.

As shown in the particular example of FIG. 2A and in following FIGS. 2B through 3B, the mobile assets are law enforcement vehicles that are assigned particular driving routes over a network of streets and/or roads. Although a particular example of an implementation is shown in the figures, it is noted that the techniques described herein can be applied in different contexts where mobile assets are assigned routes corresponding to one or more geographic areas according to particular coverage objectives.

One such alternative example is a taxi system where it is desirable to have particular areas covered to a certain extent according to certain objectives. Another example is a garbage collection system where an objective is to have a mobile asset (i.e., a garbage truck) cover routes to pick up garbage at specific locations according to a particular schedule. In any such contexts, a failure of a mobile asset could interrupt the coverage objectives. In such cases, it is necessary to re-deploy remaining mobile assets to effect the coverage objective. Techniques for identifying interruptions and redeploying assets are described below, with respect to subsequent figures.

Example Asset Routing Objectives

Figure 2B:
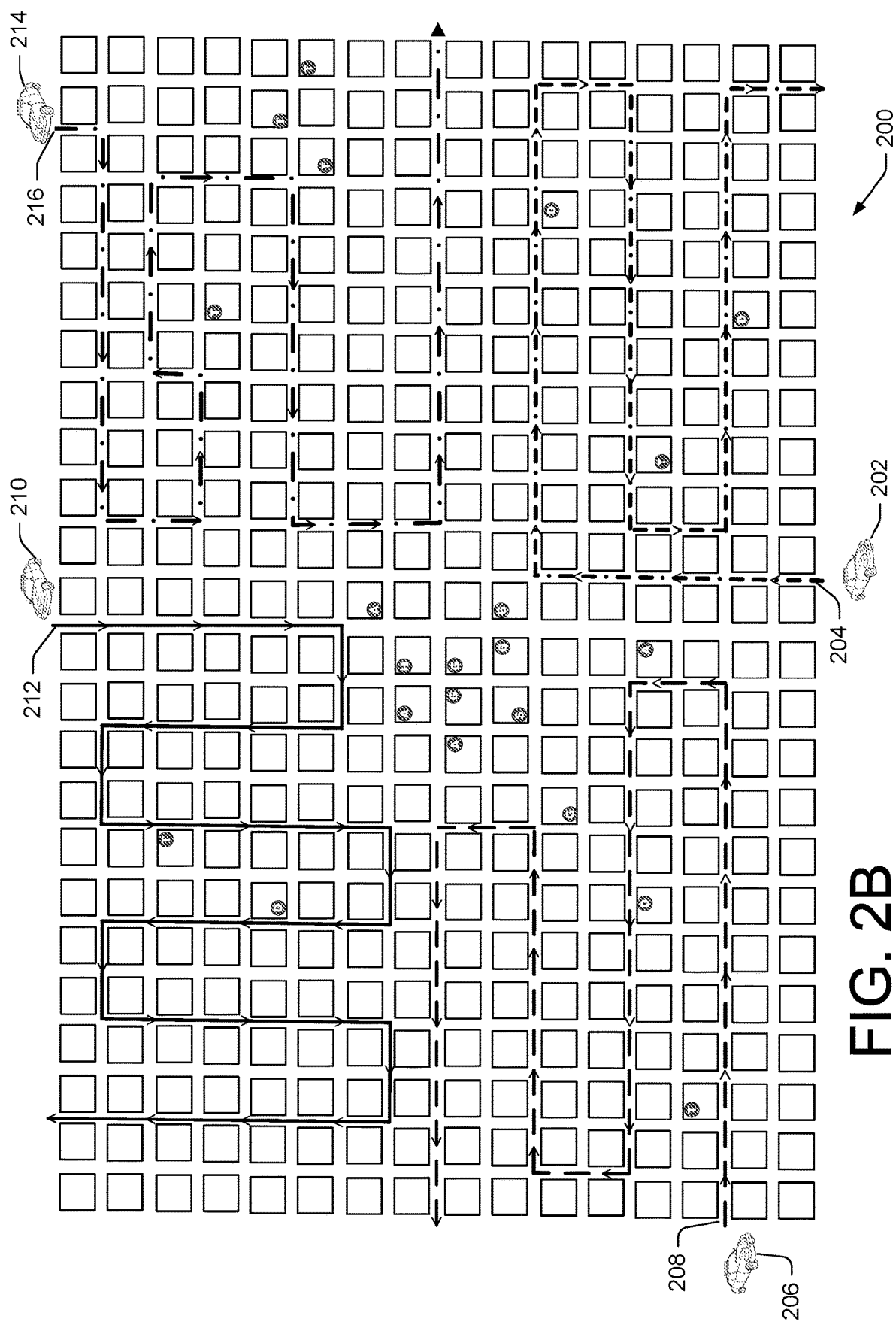
FIG. 2B is a diagram depicting the street grid and routes of FIG. 2A with an overlay of target crime incidents.
Figure 2C:
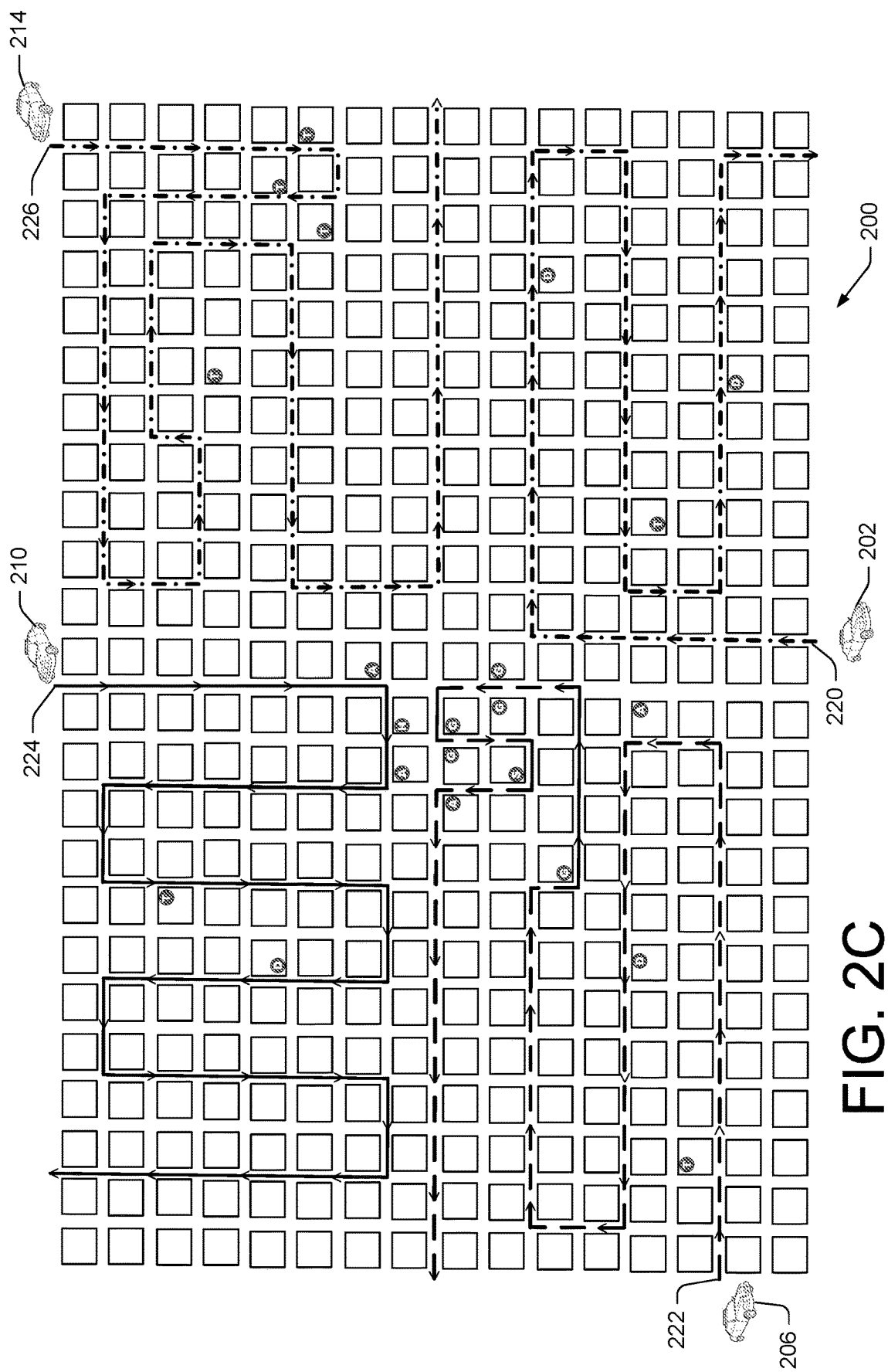
FIG. 2C is a diagram depicting the street grid and crime incidents shown in FIG. 2B, showing updated routes for the law enforcement patrol vehicles to provide coverage for the target crime incidents.

FIGS. 2B and 2C are diagrams of an example of routing assets according to coverage objectives. The diagram in FIG. 2B depicts the street grid 200 and the mobile assets 202, 206, 210, 214 shown in FIG. 2A. In the present example, the street grid 200 has been overlaid with locations of multiple crime incidents indicated with one of the letters T, D, G, H, S, or A. The letters indicate certain types of criminal incidents as shown below:

| Letter | Crime Type |
| --- | --- |
| T | Theft |
| D | Domestic Violence |
| G | Gang-related Crime |
| H | Homicide |
| S | Sex Crime |
| A | Assault |

It is noted that only a limited number of types of crimes are indicated herein, and that multiple other crimes and designations may also be shown on a similar diagram. Also, it is noted that a single incident may involve more than one type of crime. For example, a domestic violence incident may also be designated as an assault. For purposes of the present discussion, each crime incident has only a single designation.

In one or more implementations in other contexts, a street grid can be overlaid with different types of information. For example, a taxi application may designate historical data related to requests for passenger pickup, thus identifying areas where it may be more important to locate additional assets.

Furthermore, it can be important to identify characteristics of different locations so that certain mobile assets can be deployed to certain locations. For example, a garbage pickup service context may overlay a street grid with types of collections to be made at certain locations. Garbage collection entails pickup up different types of refuse—household trash, lawn and garden waste, recyclables, hazardous materials, etc. Since different garbage pickup vehicles are configured to pick up different types of garbage, it is important to identify what types of garbage require pickup at each location.

In the present example, identifying different types of crimes that occur in certain locations can help determine which mobile assets are deployed to each area. Frequently, some law enforcement officers have more experience in some areas than other and they are often assigned to particular crime divisions. For example, some law enforcement officers are experienced with gang-related crimes, some have more experience with domestic violence situations, some have special experience related to dealing with narcotics-related crimes, etc. In some situations, it may be advantageous to consider such special experience when determining routes and coverage objectives to deploy mobile assets. For example, if a spate of gang-related violence is detected in a particular neighborhood, it may be desirable for one or more mobile assets related to anti-gang activity to be assigned a route that covers the identified area.

FIG. 2C shows the street grid 200 with new routes that have been assigned to the mobile assets to provide improved coverage of locations where crime incidents have been reported. The first mobile asset 202 is now assigned to route 220, the second mobile asset 206 is now assigned to route 222, the third mobile asset 210 is now assigned to route 224, and the fourth mobile asset 214 is now assigned to route 226. The new routes 220, 222, 224, 226 are designed to provide more saturated coverage to locations of criminal incidents. Doing so provide more efficient deployment of the mobile assets related to coverage objectives.

Coverage objectives related the issue of how to most effectively deploy the mobile assets with regard to the criminal incident locations can vary. As shown in FIG. 2C, one coverage objective can be to drive mobile assets closer to the incident locations. Whether the mobile assets drive to the identified locations, drive past the identified locations on the nearest street, or drive within a certain distance of the identified locations is specific to a particular implementation. In one or more implementations, coverage objectives may be to actually stop at each identified location, such as an implementation to provides pickup or delivery services. In one or more implementations involving airborne mobile assets, coverage objectives may be to fly over incident locations in a manner so as to allow images to be taken of the locations or to allow a human operator to make visual inspection of the locations. Other coverage objectives are readily identified in different contexts.

Example Dynamic Asset Re-Routing

Figure 3A:
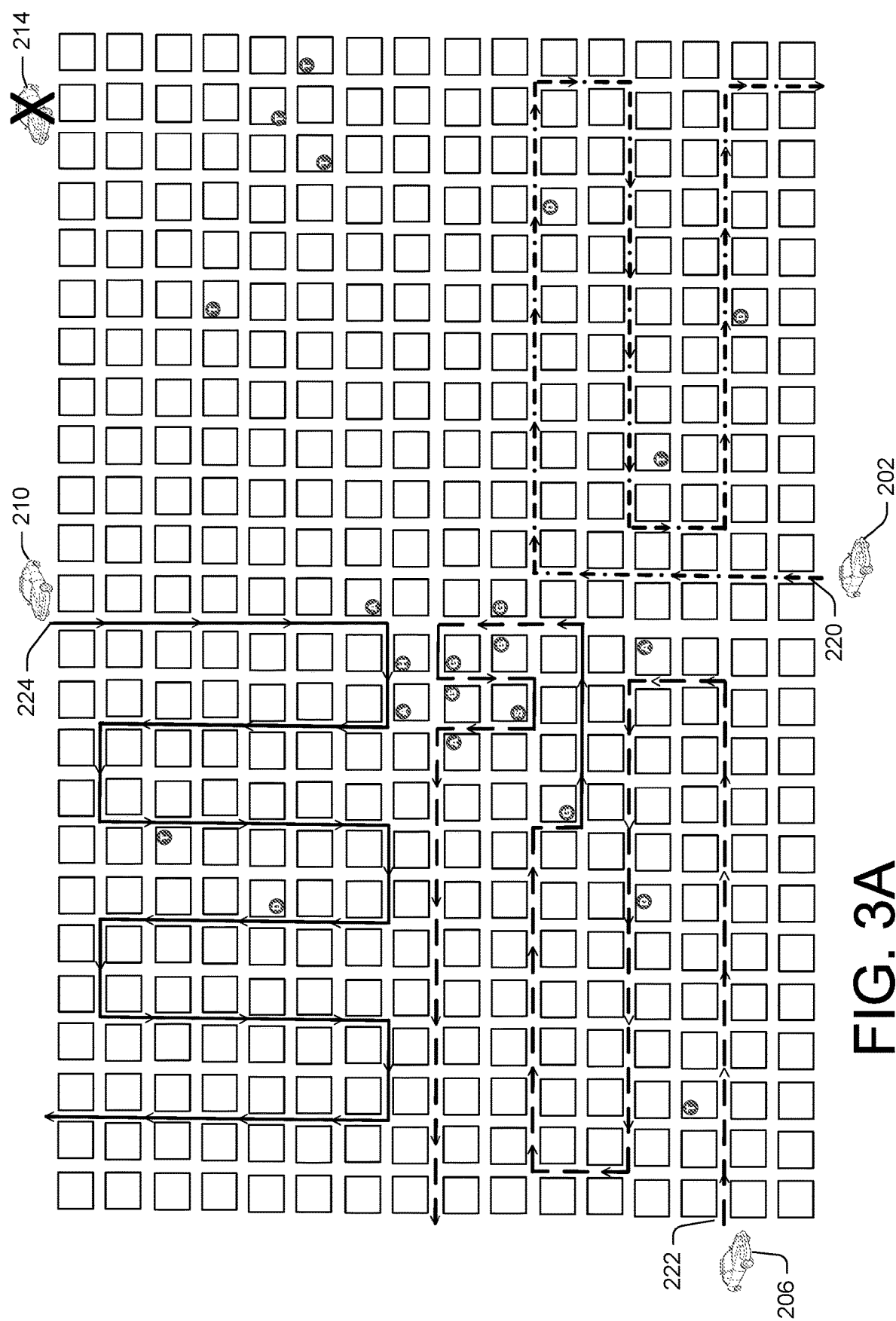
FIG. 3A is a diagram depicting the street grid and routes assigned to the law enforcement patrol vehicles, as shown in FIG. 2C, but with the absence of one of the law enforcement patrol vehicles.

FIGS. 3A and 3B are diagrams of an example of re-routing assets according to coverage objectives upon determining that a previously routed mobile asset cannot complete its route or meet coverage objectives, or if the coverage objectives change. FIG. 3A shows the street grid 200 and the mobile assets 202, 206, 210, 214 originally shown in FIG. 2A. However, in FIG. 3A, the fourth mobile asset 214 has been removed from the coverage objectives.

Mobile assets are subject to issues that can render them unable to perform tasks assigned to them. One reason a mobile asset may not be able to complete a task is that it experiences mechanical problems that render it inoperable for its intended cause. Another reason is that a mobile asset may be called to an unplanned situation when it arises. For example, in the context of law enforcement, a patrol car deployed on a specific route to cover a particular neighborhood may be called away on an emergency, such as a crime in progress.

Whatever the impetus, in a situation where mobile assets are routed according to particular coverage objectives, a mobile asset that is originally available to carry out a coverage objective may not be able to complete its assigned task. When this happens, one or more other assets, whether or not they were originally a part of the coverage objectives, can be re-deployed (or originally deployed if not part of the original coverage plan) to meet the coverage objectives without using the mobile asset that is unable to carry on.

Such a situation is depicted in FIG. 3A and FIG. 3B. When mobile asset 214 drops out of the coverage plan, i.e., when it is determined that mobile asset 214 cannot complete the route 226 assigned to it, new routes must be assigned to the remaining mobile assets 202, 206, 210 if the original coverage objectives are to be met with the remaining mobile assets 202, 206, 210. In one or more alternative implementations, an additional mobile asset may be included with the remaining mobile assets 202, 206, 210 to maintain the original coverage plan.

In FIG. 3B, the mobile assets that are available after the fourth mobile asset 214 has dropped out of the coverage plan are re-routed and provided new routes that address the original coverage objectives. The first mobile asset 202 is provided with route 302, the second mobile asset 206 is provided with route 304, and the third mobile asset 210 is provided with route 306. The new routes 302, 304, 306 address the original coverage plan, as they provide vehicle presence near criminal incident locations.

If and when the fourth mobile asset 214 or an additional mobile asset (not shown) becomes available, routes are re-calculated and assigned to each mobile asset. As different mobile assets become available or unavailable, routes are re-assessed with respect to coverage objectives and updated routes can be provided to up to all available mobile assets.

Example Computing System

Figure 4:
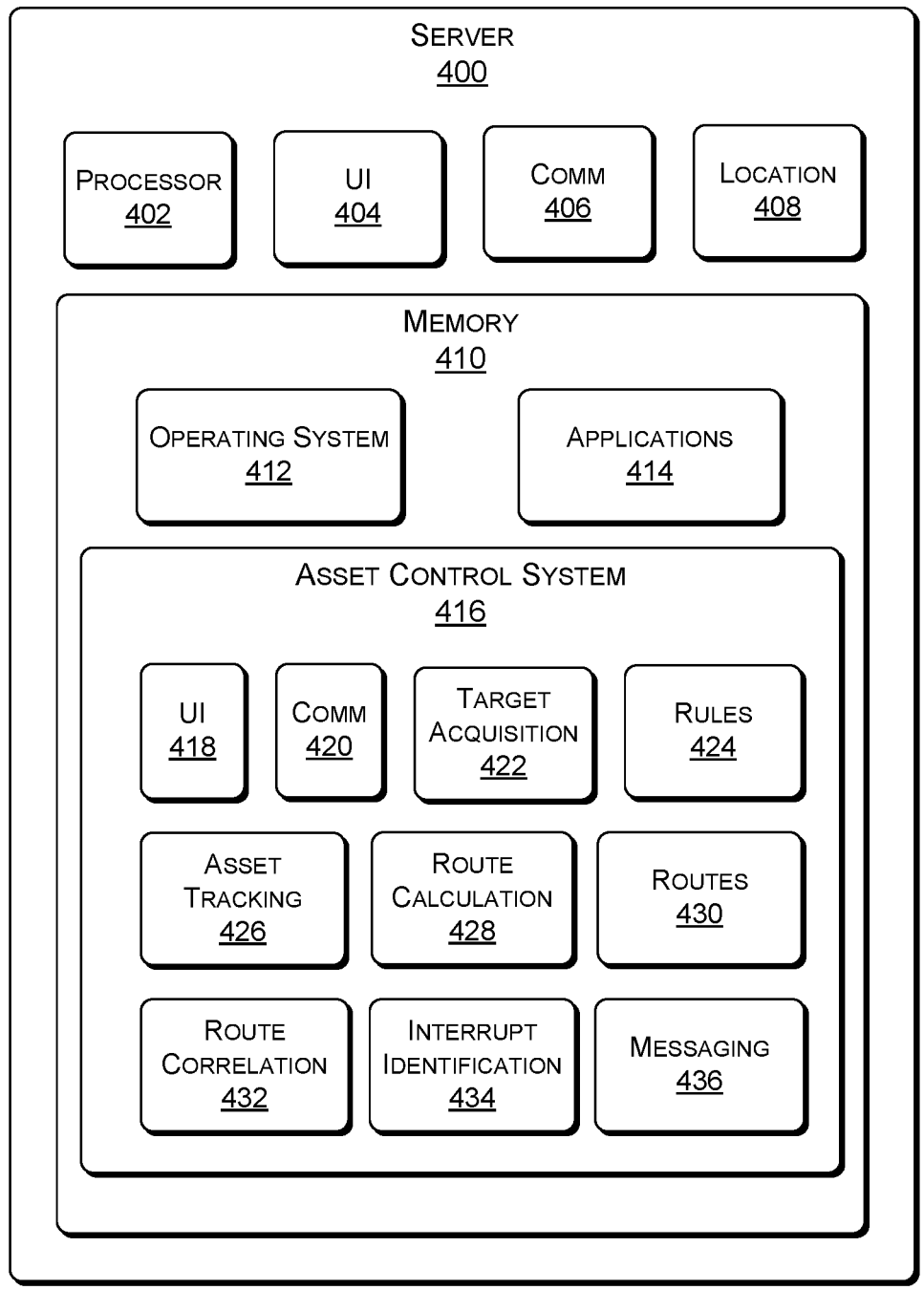
FIG. 4 is a block diagram of an example asset control system constructed in accordance with at least one implementation described herein.

FIG. 4 is a block diagram showing various components of an example computing system 400 on which techniques described herein can be implemented. Such a computing system can be implemented as a server similar to the server(s) 132 shown in and described with respect to FIG. 1.

The computing system 400 includes various components comprised of hardware, software, firmware, or a combination thereof. It is noted that when a certain component is referred to as being comprised of hardware, it should be understood that the component may also include software or firmware, or that the component may be completely implemented in software. Likewise, a reference to a component being comprised of software means at least a portion of the component may also be implemented in hardware or firmware. One skilled in the art will recognize that numerous permutations of implementations are possible to achieve the stated functions and are equivalent to the example implementations described herein.

The following description and/or the claims may include terms such as "code segment," "circuitry," "content processor," "software component," and the like. Each such term is meant to denote a configurable or programmable unit including executable instructions that, when executed, perform one or more functions stated in the claims or the present description.

The example computer system 400 includes various device hardware components that are necessary to support basic operational functionality of the example computer system 400. Such components include, but are not limited to, one or more processors 402, a user interface (UI) component 404, a communication interface 406, and a location unit 408.

The processor 402 includes electronic circuitry that executes instruction code by performing basic arithmetic, logical, control, memory, and input/output (I/O) operations specified by the instruction code. The processor 402 can be a product that is commercially available through companies such as Intel® or AMD®, or it can be one that is customized to work with and control and particular system.

The UI component 404 comprises one or more hardware components that support user interaction with the example computing device 400, such as a keyboard, a mouse, a display, a microphone, a camera, and/or the like. Touch-screen monitors may also be a part of the UI component 404 in certain implementations. For example, the following discussion references selecting certain portions of a map grid. This can be done using a touch-screen monitor by selecting individual locations or by use of a "lasso" technique.

The communication interface 406 facilitates communication with components located outside the example computing device 400, and provides networking capabilities for the example computing device 400. For example, the example computing device 400, by way of the communication interface, may exchange data with other electronic devices (e.g., laptops, computers, other servers, etc.) via one or more networks, such as the Internet, the network 134 (FIG. 1) of which the Network Operation Center 102 (FIG. 1) is a part. Communications between the example computer system 400 and the other electronic devices may utilize any sort of communication protocol for sending and receiving messages, such as TCP/IP and/or HTTP. In some embodiments, the example computing system 400 may be substituted with a plurality of networked servers, such as servers in a cloud computing network.

The location unit 408 includes one or more electronic devices that are used to identify a location of a mobile asset. In the techniques described herein, mobile asset locations are tracked and location data and route directions are provided. The location unit 408 includes any device known in the art that can be used to identify a remote, mobile asset. This can include a Global Positioning System (GPS) receiver, a cellular service location element, or other devices having similar functions.

The example computing system 400 also includes memory 410 that stores data, executable instructions, modules, components, data structures, etc. The memory 410 may be implemented using computer readable media, such as computer storage media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The one or more processors 402 and the memory 410 of the example computing system 400 implement an operating system 412. The operating system 412 includes components that enable the example computing system 400 to receive and transmit data via various inputs (e.g., user controls, network interfaces, and/or memory devices), as well as process data using the one or more processors 402 to generate output. The operating system 412 may include a presentation component that presents the output (e.g., display the data on an electronic display, store the data in memory, transmit the data to another electronic device, etc.). Additionally, the operating system 412 may include other components that perform various additional functions generally associated with an operating system. The memory 410 may also store various software applications 414 that are used to implement various functions that are not described in detail herein.

The memory 410 stores an asset control system 416 similar to the asset control system 136 shown in FIG. 1. Generally, the asset control system 416 controls mobile assets by monitoring location of mobile assets, determining which mobile assets are available for deployment, determining routing for at least one mobile asset, monitoring routed mobile assets to determine if a route has been interrupted, re-calculating mobile asset routes in the event that a routed mobile asset is unable to complete its route or a number of mobile assets available for deployment changes, and re-deploying mobile assets according to re-calculated routes.

The asset control system 416 includes a user interface component 418 that includes computer-executable instructions configured to receive user input and transmit output to a user in conjunction with the UI component 404 of the example computer system 400. The asset control system 416 also includes a communication interface component 420 that includes computer-executable instructions configured to provide communications to and from the asset control system 416 by way of the communication interface component 404 of the example computing system 400.

A target acquisition code segment 422 is also included in the asset control system 416, and includes computer-executable instructions configured to acquire targets from user input or from programmatic input. For example, a user may input target locations that are used to shape coverage objections by any known method, such as by entering physical addresses or geographic locations into the example computer system 400. Another way in which targets may be acquired is by presenting a group of locations to a user, such as in a map, and accepting targets included in an area identified by the user. For example, the user can identify an area by drawing a substantially enclosed boundary on the map, in which case all locations within the boundary are identified as targets. Other methods exist that can be used for this purpose.

The target acquisition code segment 422 can also be configured to accept input to identify targets for inclusion in a coverage objective. For example, the target acquisition code may receive a listing of identified targets. As in the example shown in and described with respect to FIG. 2B, the target acquisition code segment 422 may be configured to accept data related to crime statistics that include locations of occurrences of criminal acts, which can be correlated or overlaid on a map to identify locations on the map.

The target acquisition code segment 422 can also be configured to receive input that includes data associated with targets, such as the types of crimes committed at each location as shown in FIG. 2B. Or in the context of a pickup/delivery service, such data may include the content and/or size of one or more packages to be picked up or delivered to each location, thereby providing information about the capabilities of mobile assets that can be assigned to cover the target.

A rules code segment 424 includes computer-executable instructions and is configured to handle pre-defined or user-defined rules that relate to coverage objectives. Rules described by the rules code segment 424 define coverage objectives as they relate to the acquired targets. For example, a rule can state that a mobile asset should deploy to each of the acquired targets a designated number of times within a certain period of time. In a context of law enforcement patrols, such a rule may be that a patrol car pass by each of the acquired targets once every hour. Rules are typically defined by users and certain rules may apply by default to targets, or may be selected by a user for each target acquired or at each instance of target acquisition.

The asset control system 416 also includes an asset tracking code segment 426 that includes computer-executable instructions and works with the location unit 408 to identify current locations of mobile assets, to track movement of mobile assets over time, to identify availability of mobile assets, to identify capabilities of mobile assets, and to process mobile asset location data in other ways. The tracking code segment 426 may also include a tracking history of one or more mobile asset that can be used with certain statistics (e.g., crime statistics). Such a tracking history can be used to analyze changes that should be made to mobile asset routing, to identify mobile asset locations at a certain point in history (e.g., when a particular crime at a particular location was committed), or to provide data for forensic analysis.

A route calculation code segment 428 includes computer-executable instructions and is included in the asset control system 416. The route calculation code segment 428 is configured to calculate a route for one or more mobile assets so that rules identified in the rules code segment 424 are satisfied and coverage objectives are attained. The route calculation code segment 428 is configurable so that calculated routes take physical matters into account. For instance, the route calculation code segment 428 can be updated with road closure conditions so as not to route a mobile asset via a closed street, or so as to reduce routing on freeways or streets with speed limits over a particular limit. Routes that are calculated by the route calculation code segment 428 as stored in to routes code segment. Data related to the route and route determination factors may also be stored in the routes code segment 430.

The asset control system 410 also includes a route correlation code segment 432 that includes computer-executable instructions and is configured to receive inputs from the asset tracking code segment 426 and the routes code segment 430 and determine if one or more routed mobile assets are deviating from an assigned route. What constitutes a deviation may be pre-set or user-configurable. In one example, a deviation may be deemed to occur when a mobile asset navigates off the assigned route for a certain amount of time or by a certain distance. In an alternative example, a deviation may be deemed to occur when a mobile asset has not arrived at a target location within a limit designated by a rule delineated in the rules code segment 424. Other conditions may be used for determining when a deviation has occurred.

When the route correlation code segment 432 determines that a deviation has occurred, it notifies an interrupt identification code segment 434 of the occurrence. The interrupt identification code segment 434 includes computer-executable instructions and acts as a common indicator that a route interruption, or a deviation, has occurred which prevents a mobile asset from reaching its routing objective. The interrupt identification code segment 434, though shown as an independent module in FIG. 4, may be included with one or more other code segments. However, using a common code segment for this function allows multiple components to use common code to take action when an interruption has taken place. When the interruption identification code segment 434 is notified of a route interruption, it starts a process to re-deploy non-interrupted assets to meet the coverage objectives.

Another component that can use the interruption identification code segment 434 is a messaging code segment 436, also included in the asset control system 416. The messaging code segment 436 includes computer-executable instructions and is configured to monitor messages transmitted to and from mobile assets. Messages are transmitted between the Network Operations Center 102 (FIG. 1) and the example computer system 400 via the communication interface 406. The messages may consist of voice and/or data communications from a dispatcher or mobile asset director. The messaging code segment 436 is configured to identify certain messages as containing content that will cause an interruption in a route assigned to a mobile asset, and to notify the interrupt identification code segment 434 that an interruption has occurred.

Any method that can identify message content may be used by the messaging code segment 436. For example, a law enforcement dispatcher may issue a call to a particular mobile asset to respond to a police call at a certain location. By having to respond to this command, the mobile asset that is part of a coverage plan will not be able to complete an assigned route. Thus, the route of the mobile asset is interrupted and re-routing of other available mobile assets may be required to meet the coverage objectives.

Another example is in the context of a text messaging system. Some systems utilizing mobile assets may rely on text or data messages to provide direction to mobile assets. For example, a control system that directs unmanned mobile assets uses messages including codes and data to provide instructions to the mobile assets. In such cases, the messaging code segment 436 monitors contents of messages and is configured to identify certain codes or instructions as ones that will cause an interrupt to a currently assigned route. Rather than have an operator manually indicate that a coverage plan is no longer operative and initiate re-routing, the messaging code segment 436 handles this automatically.

In the context of a system that uses unmanned airborne mobile assets, for example, an operator may enter geographic coordinates to direct an unmanned airborne mobile asset to a specific location. In such a case, the messaging code segment 436 can be configured to identify a transmission of coordinates to the mobile asset as an indication of an interruption. In such a case, the messaging code segment 436 notifies the interruption identification code segment 434 that an interruption has occurred, thereby triggering the interruption code segment 434 to initiate a route update for other mobile assets.

Additional capabilities, functionality, and structure of the example computing system 400 and its components may be clarified and/or become apparent in the following discussion relating to an exemplary process used in conjunction with one or more of the implementations previously described with respect to FIGS. 1-4.

Example Process

Figure 5:
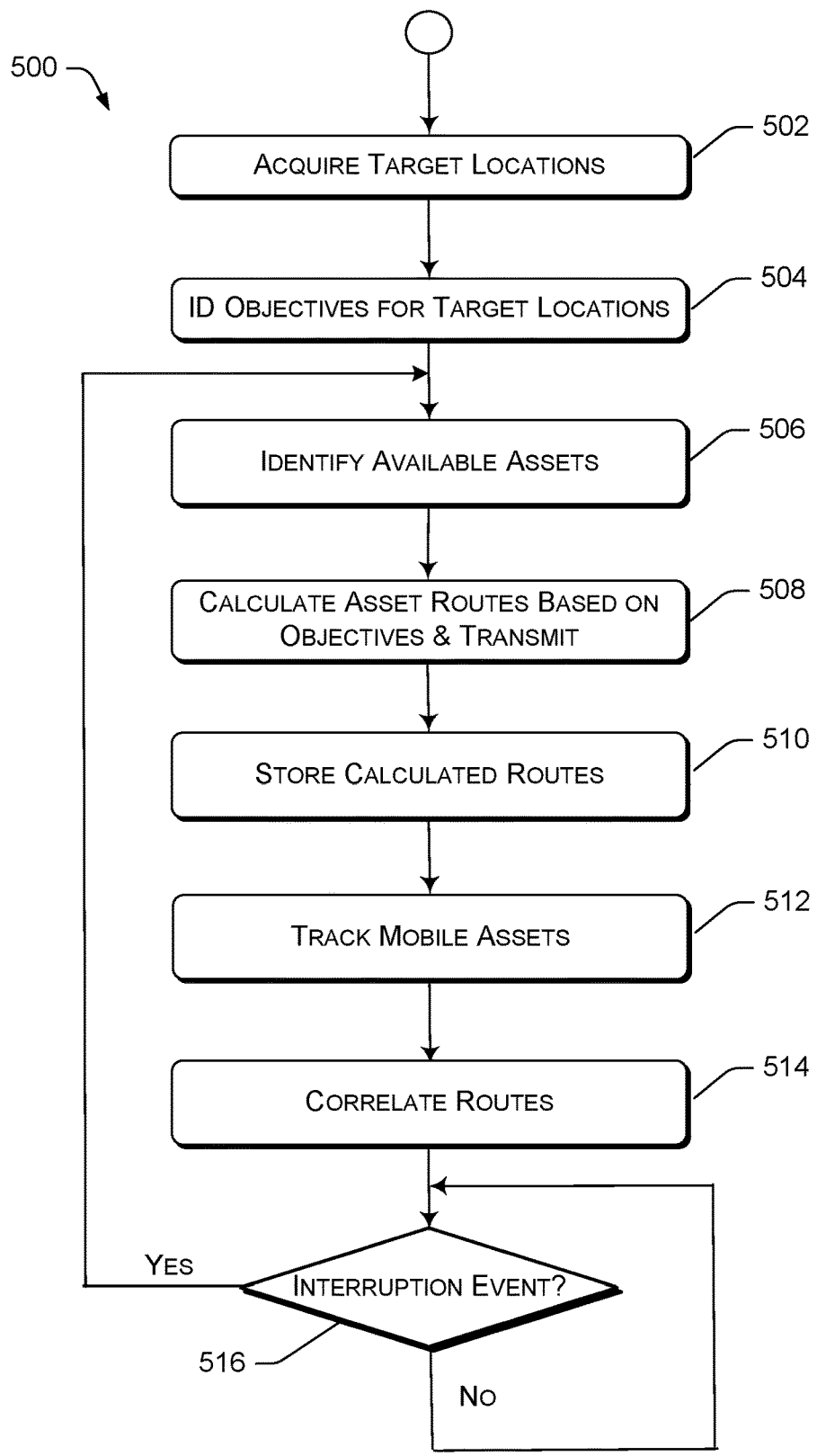
FIG. 5 is a flow diagram of an example process for providing dynamic target coverage using mobile assets.

FIG. 5 presents an exemplary process 500 for implementation of the techniques described herein. The exemplary process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, code segments, objects, components, data structures, and the like that perform particular functions or implement particular abstract data types. The order in which the operations are described is not intended to be construed as a limitation, and any number of the described blocks can be combined in any order and/or in parallel to implement the process. In addition, stages of implemented processes may differ from the stages shown in FIG. 5 in that multiple process steps may be performed for each of the functions identified with particular blocks of the exemplary process 500. In the following discussion of the exemplary process 500, continuing reference is made to the elements and reference numerals shown and described with respect to previous figures.

The exemplary process 500 depicts a process for maintaining target coverage objectives with mobile assets even in the event of a failure of a mobile asset to complete an assigned coverage route. The exemplary process 500 depicted by the flow diagram is one that can be performed by the asset control system 400 of FIG. 4. Certain alternative implementations may perform one or more operations of the process in one or more other components of the network operation center shown and described in relation to FIG. 1.

At block 502, target locations are acquired by the target acquisition code segment 422 of the asset control system 410. Information is provided to a user via the user interface component 404 of the exemplary computing system 400 and the user interface code segment 418 of the asset control system 416. The information is provided in one or more of multiple ways, such as displaying a map on a touchscreen device.

The user provides target location input by, for example, selecting locations on a map, overlaying locations of interest on a map or street grid, inputting one or more locations (e.g., addresses or geographic coordinates, etc.), or by other known means.

Once targets locations have been identified, coverage objectives related to the target locations are identified at block 504. Such coverage objectives are defined by one or more rules delineated in the rules code segment 424. The coverage objectives identify one or more assets to be deployed to each target location, either to make a delivery or pickup at each target location within a certain time frame, to drive by each target location a specified number of times within a specified time frame, to image each target location at or around a particular time (e.g., by flying over or driving by the target locations and taking photos or videos, etc.), etc.

Mobile assets that are available for deployment related to the coverage objectives are identified by the asset tracking code segment 426 at block 506. The asset tracking code segment 426 includes rules for that define when a mobile asset is "available." Such rules may be pre-set in a system or may be user-defined. For example, a mobile asset not currently assigned to a particular route may be considered available. Or the mobile asset may need to be located within a certain distance from one or more target locations to be considered available. Different contexts will require different determinations of when a mobile asset is available.

At block 508, routes for mobile assets are calculated by the route calculation code segment 428 and are transmitted to the mobile assets, typically via the communication interface component 406 of the exemplary computer system 400. As previously discussed, routing calculation can take various factors into account, such as times of day with more traffic, a desire to use roads having speed limits under a certain value, etc. Calculated routes are stored in the routes code segment 430 at block 510.

At block 512, the mobile assets that have been assigned routes are tracked. This can be performed by the asset tracking code segment 426, which provides mobile asset locations and location histories and provides said locations and histories to the route correlation code segment 432. The location histories for each mobile asset provides an actual route that is traversed by each mobile asset.

The route correlation code segment 432 correlates the location and actual routes traveled by each mobile asset with the route assigned to each mobile asset (block 524). By comparing a route assigned to a mobile asset with the actual route traversed by the mobile asset, the rout correlation code segment 432 determines when the mobile asset deviates from the route assigned to it. A user can define what constitutes a "deviation," as previously discussed. A deviation can occur when a mobile asset takes a route other than the assigned route for a specified amount of time or distance. Other definitions of a deviation can be used for different contexts.

At block 516, the determination is made as to whether an interruption of a mobile asset route has occurred. In at least one implementation, an interruption is identified by the route correlation code segment 432 when a deviation is detected. In one or more implementations, it may be that multiple deviations occur before an interruption is identified. Implementations may vary in this regard. An interruption may also be identified by the messaging code segment 436 when it recognizes content in a message that indicates that a mobile asset cannot complete its assigned route. For example, if new destination is transmitted by voice or data to a mobile device, the messaging code segment 436 can recognize that a result of the message will be that the mobile asset will proceed to the new destination, thus not completing its previously assigned route. In such a case, the messaging code segment 426 will alert the interrupt identification code segment 434 that coverage routes will need to be re-assessed and that mobile assets may need to be re-deployed.

As long as no interruptions is detected ("No" branch, block 516), the monitoring activities continue. When an interruption is identified ("Yes" branch, block 516), the process reverts to block 506. The process continues until a user interruption or programmatic interruption occurs.

After the process reverts to block 506 (i.e., an interruption is identified), available assets are identified and new routes are calculated to attain the coverage objectives with the remaining mobile assets. Because mobile assets that are assigned a route in the coverage plan that includes the interrupted route, they would normally indicate that they are unavailable. To facilitate re-routing of those assets, an assignment to a coverage plan that includes the interrupted route will not cause those mobile assets to indicate that they are unavailable for re-routing.

If one or more additional mobile assets are available, then those mobile assets may be included in the new routing. Conversely, if one or more other mobile assets is not available, then the new routing will not provide routes to those mobile assets. In at least one implementation, the re-routing will take place for mobile assets that were originally routed in the coverage plan in which a route was interrupted and alteration of the coverage plan to add or remove mobile assets from an updated routing plan will be accomplished via user input.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   acquiring one or more target locations;
   setting coverage objectives involving the one or more target locations;
   providing a first route for a first mobile asset to follow to meet a first coverage objective of the coverage objectives;
   providing a second route for a second mobile asset to follow to meet a second coverage objective of the coverage objectives;
   providing a third route for a third mobile asset to follow to meet a third coverage objective of the coverage objectives;
   tracking movement of the first mobile asset to determine an actual route of the first mobile asset;
   determining that the first coverage objective cannot be met by the first mobile asset, including:
      detecting that the first mobile asset navigated off the first route,
      determining, in response to detecting that the first mobile asset navigated off the first route, that the actual route deviated from the first route,
      determining that the first route cannot be met by the first mobile asset because the actual route deviated from the first route, and
      detecting message content that indicates that the first mobile asset cannot complete the first route; and
   in response to determining that the first coverage objective cannot be met by the first mobile asset, re-deploying the second and third mobile assets to collectively meet the first coverage objective and at least one of the second and third coverage objectives.

2. The method as recited in claim 1, wherein providing the first route for the first mobile asset further comprises:
   determining the first route; and
   transmitting the first route to the first mobile asset.

3. The method as recited in claim 1, wherein determining that the actual route of the first mobile asset deviates from the first route comprises determining that the first mobile asset navigated off the first route for at least a specified amount of time.

4. The method as recited in claim 1, wherein each of the one or more target locations is identified by a street address.

5. The method as recited in claim 1, wherein each of the one or more target locations is identified by a geographical sector.

6. The method as recited in claim 1, further comprising automatically re-deploying the second and third mobile assets to collectively meet the first coverage objective and at least one of the second and third coverage objectives in response to determining that the first coverage objective cannot be met by the first mobile asset.

7. The method as recited in claim 1, further comprising:
   determining that the second coverage objective has not been met by the second mobile asset;

wherein providing the third route for the third mobile asset is in response to determining that the second coverage objective has not been met by the second mobile asset.

8. The method of claim 1, wherein the message content is one of voice or text.

9. A system, comprising:
one or more processors;
memory communicatively coupled to the one or more processors;
a target acquisition code segment configured to acquire one or more target locations;
an asset tracking code segment configured to identify locations of multiple mobile assets and to track movements of the multiple mobile assets;
a route calculation code segment configured to calculate a route for each of the mobile assets to follow to collectively meet coverage objectives and to initiate transmission of calculated routes to respective ones of the mobile assets in accordance with the tracked movements;
a routes code segment configured to store the routes calculated for the mobile assets;
an interrupt identification code segment configured to identify an interruption of a first mobile asset of the mobile assets, initiate calculation of updated routes for the mobile assets that have not been interrupted, and start a process to re-deploy the non-interrupted assets to meet the coverage objectives;
a route correlation code segment that is configured to determine that an interruption has occurred because one of the mobile assets deviates from the route calculated for that mobile asset, a deviation being deemed to occur when the one of the mobile assets navigates off the route calculated for that mobile asset; and
a messaging code segment that is configured to identify certain message content as indicating that an interruption has occurred.

10. The system as recited in claim 9, wherein the route correlation code segment is further configured to determine that an interruption has occurred when one of the mobile assets navigates off the route calculated for that mobile asset for a predetermined amount of time.

11. The system as recited in claim 9, wherein the route correlation code segment is further configured to determine that an interruption has occurred when one of the mobile assets navigates off the route calculated for that mobile asset by a predetermined distance.

12. The system as recited in claim 9, wherein the route calculation code segment is further configured to calculate a route that identifies a specific path for a specific mobile asset to follow.

13. The system as recited in claim 9, further comprising an overlay component that correlates one or more statistics with a map of an area covered by the mobile assets to meet the coverage objectives, and wherein the target acquisition code segment is further configured to acquire targets based on statistics correlated with a location identified on the map.

14. The system of claim 9, wherein the interrupt identification code segment uses a common code segment as a common indicator that a route interruption has occurred which prevents the first mobile asset from reaching its coverage objective.

15. The system of claim 9, wherein the messaging code segment is configured to identify a transmission of coordinates as an indication of an interruption and notify the interrupt identification code segment that the interruption has occurred.

16. One or more non-transitory computer-readable media including computer-executable instructions that, when executed on a processor, perform the following operations:
identifying multiple assets that are available for deployment;
deploying assets of the multiple assets that are available for deployment;
setting coverage objectives to be met by the deployed assets;
providing route information to each of the deployed assets, the route information indicating at least a destination to be reached by the deployed asset;
tracking each asset to determine if an asset deviates from the provided route;
detecting that one of the deployed assets navigated off its provided route,
determining, in response to detecting that one of the deployed assets navigated off its provided route, that an interruption occurred that renders the asset unavailable, including detecting message content that indicates that the asset cannot complete the provided route;
providing updated route information to at least one available deployed asset, the updated route information including at least a portion of the route provided to the deployed asset that was rendered unavailable; and
re-deploying at least two of the deployed assets including the at least one available asset to collectively meet the coverage objectives.

17. The one or more non-transitory computer-readable media as recited in claim 16, wherein detecting an interruption further comprises detecting a re-assignment of an asset that indicates that the asset cannot complete the provided route.

* * * * *